United States Patent [19]
Kawabe et al.

[11] 4,300,089
[45] Nov. 10, 1981

[54] DEVICE FOR STARTING AC LOAD USING AC GENERATOR AS POWER SOURCE

[76] Inventors: Takao Kawabe; Yoshiyuki Kawabe, both of 41-5, Higashiogu 2-chome, Arakawa-ku, Tokyo, Japan, 116

[21] Appl. No.: 105,853

[22] Filed: Dec. 20, 1979

[30] Foreign Application Priority Data

Dec. 27, 1978 [JP] Japan ............................. 53-160180

[51] Int. Cl.³ .......................... H02P 1/00; H02P 9/40
[52] U.S. Cl. .................................. 322/8; 219/133; 318/140; 322/90; 322/96
[58] Field of Search ..................... 322/89, 90, 95, 96, 322/8, 7, 93, 94; 219/133, 134; 318/140, 141

[56] References Cited
U.S. PATENT DOCUMENTS 3,649,903  3/1972  Fiedler ........................... 322/90 X Primary Examiner—Robert J. Hickey
Attorney, Agent, or Firm—Cushman, Darby & Cushman

[57] ABSTRACT

In a device for starting an AC load powered by an AC generator and designed so that, prior to starting the load, the magnetic circuit of the generator is saturated to prevent an abrupt large drop of terminal voltage thereof when starting the load, and that in this state the load is started. A starting device comprising a coil for saturating the magnetic circuit of the generator and a starter coil both of which are wound in a same direction around a common closed magnetic path to couple these two coils magnetically, and operative so that, after saturating the magnetic circuit of the generator by the saturating coil, the connections of the two coils are switched over to start the load, and that by the reverse voltage induced in the starter coil by the energized saturating coil, the surge current which is produced, when the load is started, at the time of switching the coil connections is suppressed.

7 Claims, 6 Drawing Figures

DEVICE FOR STARTING AC LOAD USING AC GENERATOR AS POWER SOURCE

BACKGROUND OF THE INVENTION

1. Field of the Invention

The present invention relates to improvement of a device for starting an AC load powdered by supply, an AC generator driven by either an engine or a motor.

2. Description of the Prior Art

It is well known that, when an AC load is started by the use of, as a power supply, either an engine generator or a motor generator, especially in case the load has lagging power factor such as an induction motor or an AC arc welder, the terminal voltage of the generator exhibits an abrupt large drop.

Generators of this type are usually provided with an automatic voltage regulator to regulate voltage drops due to load fluctuation. However, such automatic voltage regulator cannot fully counteract the abrupt and large initial voltage drop.

For the above-said reason, it has been practiced in general to use a generator having a capacity large enough to compensate for the voltage drop at the start. However, such counter-measure leads to expansion in the size of the system and increased cost.

In order to improve the above-mentioned inconvenience and disadvantage, there has been proposed and known a method of saturating the magnetic circuit of a generator by such means as a saturating coil prior to starting, and of starting the load in this state.

This known method is such that the load is started at the moment that the terminal voltage of the generator has temporarily leaped up to the non-loaded voltage by saturation of the magnetic circuit. Accordingly, it is possible to reduce the initial voltage drop supplied to the load which is connected to the generator and to thereby elevate the voltage supplied to the load. In order to insure this pattern of operation, however, it is necessary that, at the moment of energization of the starter, the saturating coil is still connected to the generator. Because of this, the current flowing through the saturating coil will momentarily overlap the current of the starting coil on the power supply side at the moment this starting coil is energized. Moreover, the initial current of the starting coil has a surge current characteristic for the period of 1 to 3 Hz. The overlap value of this surge current of the starting coil and the current of said saturating coil is intensive and momentarily causes a drop in the terminal voltage of the generator, giving rise to possible adverse effect on other related loads.

SUMMARY OF THE INVENTION

It is a primary object of the present invention to provide a load-starting device which can improve the starting characteristic, by suppressing the surge current which is generated at the time the connections of the saturating coil and the starting coil are switched to start a load.

Another object of the present invention to provide a quasi-lining type load-starting device which is capable of feeding to a load a substantial starting voltage which is almost same in level as that of conventional lining starting system.

Still another object of the present invention is to provide a compact saturating type load-starting device in which the coil for saturating the magnetic path of the generator is integrated with the starting coil of the starting member.

These and other objects as well as the features and advantages of the present invention will become apparent from the following detailed description of the preferred embodiments when taken in conjunction with the accompanying drawings.

An important feature of the present invention is that the coil of the saturating section for saturating the magnetic circuit of the generator and the coil of the load-starting section are wound in a same direction around a common magnetic path to magnetically couple these two coils together, and operative so that after the magnetic circuit of the generator has been saturated by connecting said saturating coil to the generator, the connections of this saturating coil and the starting coil are changed over, and thus the load is started, whereby the initial surge current at the time of said change-over of connections of coils is suppressed by the reverse voltage in the starting coil of the starting section which is induced therein upon energization of said saturating coil.

In the present invention, a generator means is one which is driven by either an engine or a motor, and to which either high voltage or low voltage may be applied.

The load-starting device employed in the present invention points to either one of a reactor type device and a compensator type device. A reactor and a compensator employed in this field of art are well known to those skilled in the art.

DETAILED DESCRIPTION OF THE PREFERRED EMBODIMENTS

Figure 1:
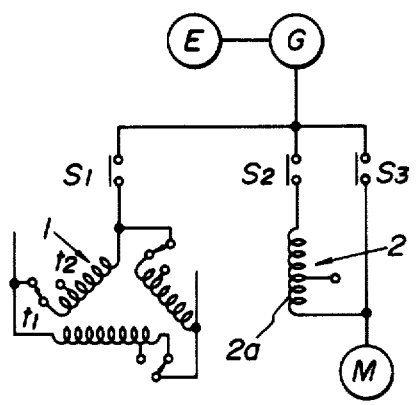
FIG. 1 is a wiring diagram of one-phase portion of three phases, showing a first embodiment of the load-starting device according to the present invention.

FIG. 1 is a wiring diagram of one-phase portion of three phases, showing an embodiment in which the load-starting device of the present invention is applied to a reactor type starting device. Symbol E represents an engine. G represents a generator. M represents an electric motor. The starter of the present invention is arranged so that a saturating coil 1 of a saturating section having delta-wiring and a reactor coil $2a$ of a starting section 2 are wound around a common closed magnetic path 3 to integrate said saturating coil and said reactor coil in one unit. The saturating coil 1 is connected to the magnetic circuit of the generator G via a switch $S_1$. The reactor type starting section 2 is connected to an output terminal not shown of the generator G via a starting switch $S_2$ and an operating switch $S_3$.

Figure 3:
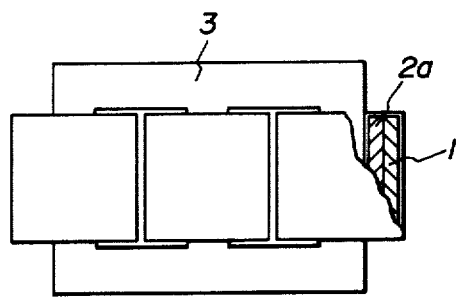
FIGS. 3 and 4 are structural representations showing the relationship between the closed magnetic path and the coils wound around this closed magnetic path.
Figure 4:
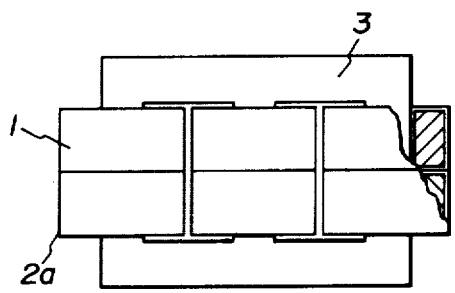

The saturating coil of the saturating section and the starting coil 2a of the reactor type starting section 2 are wound in a same direction relative to the common closed magnetic path 3. For example, in a manner as shown in FIG. 3, the coil 2a of the starting section 2 may be superposed on the saturating coil 1 when they are wound around the magnetic path. Alternatively, the coil 2a of the coil 1 may be wound separately from each other, as shown in FIG. 4.

Figure 2:
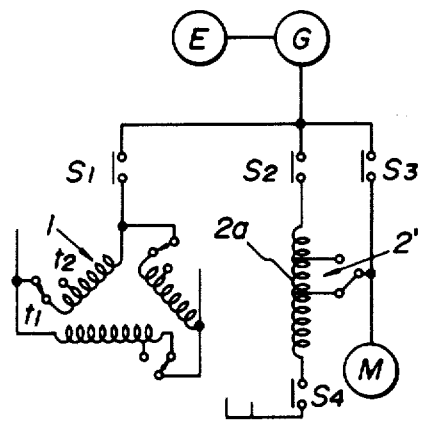
FIG. 2 is a wiring diagram of one-phase portion of three phases, showing a second embodiment of the load-starting device according to the present invention.

FIG. 2 is a wiring diagram of one-phase portion of three phases, showing an embodiment in which the load-starting device of the present invention is applied to a starting compensator type starting section. Reference numeral 1 represents a saturating coil having delta-winding. 2' represents a starting compensator. 2a represents a starting coil of this starting compensator. $S_1$ represents a switch for the saturating coil. $S_2$ represents a starting switch. $S_3$ represents an operating switch. $S_4$ represents a neutral point switch. In this instant embodiment also, coils 1 and 2a are wound around a common closed magnetic path 3 in a manner shown either in FIG. 3 or FIG. 4.

Next, the manner of starting a load will hereunder be explained with respect to the embodiment shown in FIG. 1.

Firstly, the switch $S_1$ is closed, and immediately prior to the starting of the load or motor, the saturating coil 1 is loaded on the generator G to accelerate the saturation of the magnetic circuit of the generator. After a period of time of 15/50-20/50 second, the switch $S_2$ is closed, so that the motor M is started through the starting coil of the reactor type starting section 2. After the lapse of time of 1/50-2/50 second, the switch $S_1$ is opened to disconnect the saturating coil 1 from the power supply. Whereupon, the motor M is rendered to its starting state by the reactor type starting section 2. After the motor has accelerated its running speed, the switch $S_3$ is closed, and along therewith the switch $S_2$ is opened to enter into normal the running condition.

In the aforesaid steps, it should be understood that, when the switch $S_1$ is in its closed state, a voltage is induced in the starting coil 2a of the reactor type starting section due to the fact that the saturating coil 1 and the starting coil 2a are wound around a common closed magnetic path 3. This induced voltage is opposite in polarity relative to the power supply voltage. Therefore, at the moment when the switch $S_2$ is closed and when, thus, the starting section 2 is rendered to the state ready to start the load, and the rush current of the power supply which is applied to this starting section is suppressed to a low level. Also, the surge current which is generated at such moment is absorbed in the saturating coil having delta-wiring, and thus there is performed an momentary action of preventing voltage drop of the power supply.

The value of the reverse voltage which is induced in the coil 2a of the reactor section 2 immediately before the starting switch $S_2$ is closed is determined by the ratio of turns between the saturating coil 1 and the coil 2a. The larger the capacity of the saturating coil 1 is, the smaller can be made the initial surge current. In such embodiment, it is possible to arrange so that the saturating coil is provided with selector switches $t_1$ and $t_2$ as shown and that, by selecting either one of these switches, the capacity of the saturating coil can be adjusted.

The foregoing performance is altogether identical with an instance wherein the present invention is applied to the starting compensator type starting section shown in FIG. 2.

In case the motor is started by using an engine generator as the power supply, the capacity of the engine generator is determined by the starting capacity of this motor. In general, the capacity of the AC engine generator (ACG) is expressed by the following formula (1):

$$ACG = \frac{1 - \Delta E}{\Delta E} xd'pm \qquad (1)$$

$$= \frac{1 - \Delta E}{\Delta E} xd'(\beta cp)$$

wherein:

$\Delta E$ represents a voltage drop of the generator at the starting time;

xd' represents a starting transitory reactance of the generator;

pm represents a starting capacity of the motor;

$\beta$ represents a multiple due to the starting grades of the motor;

c represents a starting coefficient of the starting section; and p represents the capacity of the motor.

The voltage drop $\Delta E$ of the motor at its starting time has its limit at 30% of the rated voltage value. In case the voltage drops lower than this level, the motor can no longer be started.

The capacity of the generator in case the motor is started by using a generator as the power supply is as shown by the afore-mentioned formula (1). Accordingly, under the condition that $\Delta E$, xd', $\beta$ and p are fixed, the capacity ACG of the generator is determined by the magnitude of the starting coefficient of the motor. In case of the reactor type starting section has a 65% tap setting, c = 0.65. In case the starting compensator has a 65% tap setting, c = (0.65)² = 0.42. Since the starting coefficient of the reactor can become about 1.55 times (0.65/0.42) that of the starting compensator, it has been seldom in the past to use a reactor type starter as the starter of a load or motor. However, in case the load-starting device according to the present invention is employed, there is provided the feature that the generator capacity at the starting of the motor can be markedly reduced by the starting device having a simple structure which is a combination of a saturating coil and a reactor type starting coil, since the generator capacity is not related only to a voltage drop $\Delta E$ of the generator and to the starting capacity pm of the motor, but also largely to the saturation degree of the magnetic circuit of the generator immediately before the starting of the motor and also to the surge current suppressing action at the time of the aforesaid change-over of the coil connections.

Table 1 shows the measured values of voltage drops of an AC generator when the conventional load-starting method is practiced as compared with the instance wherein the saturation starting of the present invention is practiced, to demonstrate the above-described effect and advantage of the present invention. It should be noted, however, that this table represents the result of an instance wherein there is used an engine generator of 20 KVA, three-phase 200 V, 50 Hz and xd' = 0.3.

TABLE 1

| Motor capacity | Conventional reduced-voltage starting | | Starting by present invention | |
| --- | --- | --- | --- | --- |
| | Reactor-starting (65% setting) | Starting compensator (65% setting) | Reactor-starting (65% setting) | Starting compensator (65% setting) |
| | ΔE | ΔE | ΔE | ΔE |
| 7.5KW | 30% | 22% | 18% | 17% |
| 11KW | 39% | 29% | 20% | 18% |
| 15KW | 46% | 36% | 23% | 20% |

(Usable range)

As will be clear from Table, 1 in the known reduced-voltage type starting device, the voltage drop in the generator in case of a reactor starting is: ΔE=30% even for a motor of 7.5 KW capacity, which is the maximum limit. Even by the use of a starting compensator, the voltage drop when starting a motor of 11 KW capacity is very close to the limit, being ΔE=29%. In good contrast thereto, by the use of the load-starting device of the present invention, the voltage drop at the start of a 15 KW motor is as low as ΔE=23% by a saturating reactor type starter not to speak of a saturating type starting compensator, thus leaving an ample reserve force in the generator capacity.

What is even more important is the fact that the difference in voltage drop ΔE at the time of starting by reactor type starting and by starting compensator in the saturating type load-start device of the present invention is noted to be extremely small when compared with the difference in voltage drop ΔE in starting by reactor and by starting compensator at the time of starting the load by relying on the known reduced-voltage starting.

This fact demonstrates that, according to the load-starting device of the present invention, the generator capacity is not determined only by the starting capacity of the motor, and also that the rush current and the surge current of the starting device at the time of change-over of coil connection are markedly suppressed due to the saturation of the magnetic circuit of the generator immediately before the starting of the generator and also to the voltage which is induced in the starter coil by the saturating coil and which is reverse of that of the power supply.

Also, the load starting device of the present invention is arranged so that the saturating reactor and the starting section are formed integral on a common magnetic path, so that the load-starting device as a whole is made compact accordingly, and that the material of core of the magnetic path can be saved by 30 to 40%.

Figure 5:
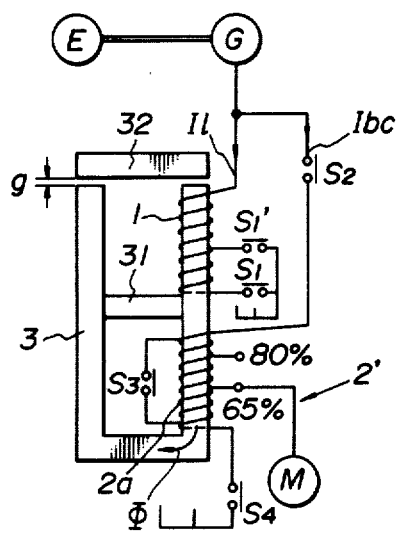
FIG. 5 is an explanatory illustration showing the magnetic path and the wiring of one-phase portion of three phases of a third embodiment of the present invention.

FIG. 5 shows a third embodiment of the load-starting device of the present invention. In this Figure, symbol E represents an engine. G represents a generator. M represents a motor. Reference numeral 1 represents a saturating coil. 2' represents a starting compensator. 3 represents a closed magnetic path. The arrangement that the saturating coil 1 and the starting coil 2a of the starting compensator 2' are wound around a common closed magnetic path is same as the arrangement of the preceding embodiments. However, the construction of this closed magnetic path is modified. That is, in this instant embodiment, there is employed a closed magnetic path 3 which has a magnetic bypass provided intermediately of the closed magnetic path, and the coil 2a of the starting compensator is wound around one of the two magnetic path sections which are formed as a result of said intermediate magnetic bypass, and a saturating coil 1 is wound around the other magnetic path section, and furthermore the coil 1 and the coil 2a are wound in the same direction. Also, a part 32 of the magnetic path section on the saturating coil side is separated from the main body of said magnetic path section, forming a gap g therebetween in such way that this gap g may be adjusted.

In FIG. 5, immediately before the start of the motor M, either the switch $S_1$ or $S_1'$ is closed to load the generator G with the saturating coil 1. Whereupon, the magnetic circuit of this generator is saturated. At the same time therewith, a magnetic flux $\phi$ is generated in the magnetic path 3 by the current $I_h$, and as a result there is induced in the coil 2a of the starting compensator a voltage which is the reverse of the voltage of the power supply.

Next, the starting switch $S_2$ of the starting compensator and the neutral switch $S_4$ are closed, and the starting compensator is energized. Whereupon, the initial surge current of the starting compensator 2' is suppressed as it receives the reverse voltage induced by the saturating coil 1. The value of this reverse voltage which is induced just before the energization of the starting compensator 2' is determined by the ratio of turns of the saturating coil 1 and the coil 2a of the starting compensator, the gap g of the core, and the leak magnetic flux of the magnetic bypass 31. The larger the capacity of the saturating coil 1 is, the smaller can be made the surge current at the time of starting the motor.

According to this instant embodiment, there is provided a magnetic bypass 31 and also a gap g in the magnetic path located on the saturating coil side, as described above. Therefore, by adjusting this gap g, it is possible to adjust the capacity of the saturating coil independently of the magnetic path of the starting compensator 2'. Whereby it is possible to set, as required, both the saturating capacity of the magnetic circuit of the generator and the characteristic of the starting compensator. Thus, indirectly, it is possible also to effect adjustment of voltage drop of a motor or like load which is connected to the generator and to effect adjustment of the capacity of the generator itself.

The starting of a motor or like load which uses an engine generator as its power supply is relied, in general, on the reduced-voltage starting method. However, the lining starting method is used also widely. This is because of the fact that, in the lining starting using commercial power supply, the voltage of the power supply is substantially constant, whereas in case an engine generator is used as a power supply, there arises a marked voltage drop at the time of starting, so that even the lining starting method corresponds to the reduced-voltage starting wherein a commercial power supply is used as the power supply, and because of the consideration that, in case of a load having a heavy load or lagging characteristic, the starting fails to take place when relied on the reduced-voltage starting method. Furthermore, in the lining starting method using an engine generator as the power supply to start a motor or like load in the generally employed conventional art, the generator is required to possess a capacity 5-7 times that of the capacity of the motor or the load. In addition, the use of the generator having such large capacity as that is only for a very short period of time of 5-15 seconds at the time of starting, and thus a tremendous waste is being incurred.

In the present invention, however, voltage drop of the generator at the time of starting is reduced due to the fact that the magnetic circuit of the generator is saturated, and concurrently therewith the saturation of the magnetic circuit exerts the action of suppressing the surge current at the time of starting. Whereby, it becomes possible to reduce the starting capacity of the motor by relying on a starting system using a trivial reduced-voltage, and to supply to a load a substantial starting voltage of a level almost same as that of conventional lining starting, and furthermore to make the capacity of the motor small to provide economy.

Figure 6:
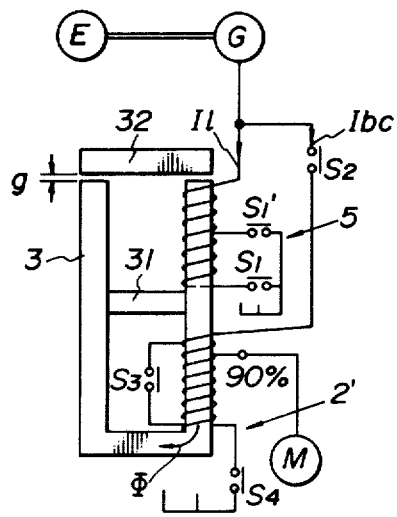
FIG. 6 is an explanatory illustration showing the magnetic path and the wirings of one-phase portion of three phases of a fourth embodiment of the present invention.

FIG. 6 is an explanatory illustration of the magnetic path and windings for one-phase portion of the starter which is capable of practicing such quasi-lining starting method as described above.

In this instance, the arrangement is exactly the same as that shown in FIG. 5, with the exception that a reduced-voltage terminals of the starting compensator 2' having a tap setting of the order of 80-95% is employed.

For example, the following operation will hereunder be considered. A motor M is connected to the reduced-voltage terminals of 90% tap setting of the starting compensator 2' as shown in FIG. 6. After the magnetic circuit of the generator has been saturated by energizing the switch $S_1$ or $S_1'$ of the saturating coil 1, the switches $S_2$ and $S_4$ of the starting compensator 2' are energized, and one moment after thereof the switches $S_1$ and $S_1'$ of the saturating coil are opened to start the motor.

Unlike the lining starting of the prior art, in the quasi-lining starting method of the present invention, it will be noted that, when the reduced-voltage terminals of the starting compensator are set at 90% as stated above, the starting capacity of the motor will be $0.9^2 = 0.81$. More specifically, the starting capacity of the motor becomes 81% of the conventional lining starting capacity. Also, at the moment when these starting switches $S_2$ and $S_4$ are made to start the motor, the current $I_f$ of the saturating coil and the current $I_{kc}$ of the starting section coil will momentarily overlap each other. However, at such moment, there is hardly produced a surge current at the start of the motor. This is because, as discussed in connection with the embodiment of FIG. 5, a voltage which is the reverse of that of the power supply has already been induced in the windings of the starting section immediately before the starting of the motor.

As discussed above, in accordance with a quasi-lining starting which is a combination of a very small reduced-voltage starting and a saturating coil, it is possible to make the starting capacity of the motor small due to the effect of the saturating coil as compared with a mere lining starting, and further to minimize the initial impact to the engine generator at the starting of the motor, and also to markedly reduce the capacity of the generator. In order to demonstrate this, there will be mentioned in the following Table 2 the result of measurements made on the conventional lining starting system and on the quasi-lining starting system of the present invention with respect to the relationship between the capacity of the coil for saturating the magnetic path of the generator, the capacity of the motor, and the voltage drop in the generator at the time of starting the load. It should be noted that this Table 2 represents the instance wherein an engine of 20 KVA, three-phase 200 V, 50 Hz and 1500 rpm is used.

TABLE 2

| Motor capacity (KW) Starting grade (F) | Lining starting voltage drop (%)/ voltage fed to motor (%) | Quasi-lining starting Saturating coil | | |
|---|---|---|---|---|
| | | 2M voltage drop (%)/ voltage fed to motor (%) | 3M voltage drop (%)/ voltage fed to motor (%) | 4M voltage drop (%)/ voltage fed to motor (%) |
| 2.2KW | 21%/79% | 11.5%/80% | 8.4%/82.5% | 5%/85.5% |
| 3.7KW | 35%/65% | 17.7%/74% | 12.3%/79% | 7.6%/83% |
| 5.5KW | 45%/55% | 26.2%/66.5% | 17%/75% | 11.2%/80% |
| 7.5KW | | 32.8%/60% | 19.2%/72.7% | 12.3%/78% |

(Usable range)

In Table 2, the capacity 2 M, 3 M and 4 M of the saturating coil represents multiples in case the capacity of the motor which is to be used is designated as M. For example, in case the motor is of a capacity of 3.7 KVA, the capacity 3 M of the saturating coil points to: $3 \times 3.7 = 11.1$ KVA.

As will be clear from Table 2, in accordance with the conventional lining starting system wherein said 20 KVA engine generator is used, the limit for the starting is for a 2.2 KW motor. In contrast thereto, in accordance with the quasi-lining starting system using the load-starting device of the present invention, if the saturating coil has the capacity of 2 M, the starting of a load is possible up to 3.7 KW motor. If the saturating coil capacity is 4 M, it is possible to start a load up to a 7.5 KW motor. Thus, the effect of the present invention is very great.

Though needless to say, it should be understood that, in the respective embodiments described above, the respective switches of the saturating coil and the starting coil can be automatically made and broken at appropriate timing by known controlling means such as timer and electromagnetic relays, though their mention is omitted in the drawings and in the explanation. Also, description of the respective embodiments has been made on the instance of three-phase load. However, the present invention can be applied also effectively to a single-phase motor. Furthermore, in the embodiments shown in FIGS. 5 and 6, it is possible to use the saturating coil in the form of delta-wiring in the same fashion as in those embodiments shown in FIGS. 1 and 2.

What is claimed is:

1. A load starting device for starting a load powered by an AC generator, comprising:
  a magnetic circuit associated with the generator;
  a load starting section having a load-starting coil wound about the magnetic circuit; and
  a saturating coil, also wound about the magnetic circuit, the load-starting and saturating coils being electrically wound in the same direction about the magnetic circuit such that when power is applied to the saturating coil from the generator, current flow in the saturating coil induces a voltage in the load-starting coil having an opposite polarity to that which would be induced on the load-starting coil upon its connection to the generator; and switch means for (a) applying power from the generator first to the saturating coil, then (b) applying power from the generator to the load-starting coil without disconnecting the application of power to the saturating coil, and then (c) removing the application of power to the saturating coil, whereby the voltage induced in the load-starting coil by current flowing in the saturating coil tends to suppress a surge of current from the generator through the load-starting coil that would otherwise occur in the absence of a saturating coil induced voltage, thereby suppressing an extreme voltage drop of the generator upon the initial application of power to the load through the load-starting coil.

2. A load-starting device according to claim 1, wherein the magnetic circuit includes an intermediate magnetic bypass to provide two portions of magnetic circuit, and said load-starting coil is wound around one of these two portions and said saturating coil is wound around the other portion thereof, and an adjustable gap is provided on that portion of the magnetic circuit around which is wound the saturating coil so that the saturating capacity of the saturating coil can be adjusted independently of the load-starting section.

3. A load-starting device according to claim 1 or claim 2, wherein the load-starting section is of a reactor starting type.

4. A load-starting device according to claim 1 or claim 2, wherein the load-starting section is of a starting compensating type.

5. A load-starting device according to claim 1 or claim 2, wherein for a three-phase load, the saturating coil has a delta-wiring configuration.

6. A load-starting device according to claim 4, wherein the starting section comprises a starting compensator having reduced-voltage terminals having an 80–95% tap setting for connection to the load.

7. A load-starting device according to claim 5, wherein said saturating coil is provided with a plurality of selective terminals so that, by selection of one of them, the capacity of the saturating coil can be adjusted.

* * * * *